(12) United States Patent
Soulie

(10) Patent No.: US 12,319,429 B2
(45) Date of Patent: Jun. 3, 2025

(54) DOUBLE-WALL HYDROGEN PIPELINE COMPRISING AT LEAST ONE SYSTEM FOR DETECTING A LEAK AT AT LEAST ONE COUPLING SYSTEM, AND AIRCRAFT COMPRISING AT LEAST ONE SUCH PIPELINE

(71) Applicant: Airbus Operations SAS, Toulouse (FR)

(72) Inventor: Adeline Soulie, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 149 days.

(21) Appl. No.: 17/952,411

(22) Filed: Sep. 26, 2022

(65) Prior Publication Data
US 2023/0102097 A1    Mar. 30, 2023

(30) Foreign Application Priority Data
Sep. 28, 2021    (FR) ...................... 2110236

(51) Int. Cl.
| | |
|---|---|
| *F16L 39/00* | (2006.01) |
| *B64D 37/00* | (2006.01) |
| *B64D 37/30* | (2006.01) |

(52) U.S. Cl.
CPC ........... *B64D 37/30* (2013.01); *B64D 37/005* (2013.01); *F16L 39/005* (2013.01); *F16L 2201/30* (2013.01)

(58) Field of Classification Search
CPC ....... F16L 39/005; F16L 23/167; F16L 23/18; F16L 23/22
See application file for complete search history.

(56) References Cited

U.S. PATENT DOCUMENTS

| | | | | |
|---|---|---|---|---|
| 3,068,026 A | * | 12/1962 | McKamey | F16L 39/005 62/50.7 |
| 3,797,564 A | * | 3/1974 | Dickinson | F16L 23/167 165/DIG. 68 |

(Continued)

FOREIGN PATENT DOCUMENTS

| | | | | |
|---|---|---|---|---|
| KR | 2010136238 A | * | 12/2010 | ............ F16L 23/167 |
| KR | 20100136238 A | | 12/2010 | |

OTHER PUBLICATIONS

Nicholsons, "Sigma Seals", "https://www.nicholsons.co.uk/products/sigma-seals/" (Year: 2019).*

(Continued)

*Primary Examiner* — Zachary T Dragicevich
*Assistant Examiner* — Alexander T Rufrano
(74) *Attorney, Agent, or Firm* — Greer, Burns & Crain, Ltd.

(57) ABSTRACT

A pipeline including at least first and second portions, each comprising outer and inner pipes, at least one coupling system connecting the first and second portions and including at least a downstream flange ring connected to at least one of the outer and inner pipes of the first portion, at least an upstream flange ring connected to at least one of the outer and inner pipes of the second portion, connecting elements connecting the upstream and downstream flange rings, first and second annular seals interposed between the upstream and downstream flange rings and configured to delimit, with the upstream and downstream flange rings, a buffer space containing an atmosphere, the pipeline comprising at least one leak detection system configured to determine at least one characteristic of the atmosphere of the buffer space.

6 Claims, 2 Drawing Sheets

(56) References Cited

U.S. PATENT DOCUMENTS

| | | | | |
|---|---|---|---|---|
| 4,723,441 | A * | 2/1988 | Sweeney | F16L 23/167 |
| | | | | 73/49.1 |
| 5,088,774 | A | 2/1992 | Spiegelman | |
| 7,942,452 | B2 * | 5/2011 | Carns | G01M 3/283 |
| | | | | 285/123.1 |
| 8,172,272 | B2 * | 5/2012 | Petit | F16L 39/005 |
| | | | | 285/302 |
| 11,608,263 | B2 * | 3/2023 | Umemura | F16L 39/04 |
| 2004/0026922 | A1 | 2/2004 | Carns et al. | |
| 2015/0285421 | A1 * | 10/2015 | Bleyer | F16L 39/005 |
| | | | | 285/123.15 |

OTHER PUBLICATIONS

French Search Report dated Apr. 20, 2022; priority document.

\* cited by examiner

DOUBLE-WALL HYDROGEN PIPELINE COMPRISING AT LEAST ONE SYSTEM FOR DETECTING A LEAK AT AT LEAST ONE COUPLING SYSTEM, AND AIRCRAFT COMPRISING AT LEAST ONE SUCH PIPELINE

CROSS-REFERENCES TO RELATED APPLICATIONS

This application claims the benefit of the French patent application No. 2110236 filed on Sep. 28, 2021, the entire disclosures of which are incorporated herein by way of reference.

FIELD OF THE INVENTION

The present invention relates to a double-wall hydrogen pipeline comprising at least one system for detecting a leak at at least one coupling system and to an aircraft comprising at least one such pipeline.

BACKGROUND OF THE INVENTION

According to one embodiment, an aircraft running on hydrogen comprises at least one hydrogen tank, hydrogen pipelines connecting the hydrogen tank and hydrogen turbine engines or fuel cells powering electric motors.

These hydrogen pipelines need to be configured to carry the hydrogen in liquid form at a temperature of the order of −270° C., and be perfectly fluid tight in order to prevent any contact between the hydrogen and the oxygen.

According to one embodiment, the hydrogen is carried in double-wall pipelines each comprising an outer pipe and an inner pipe positioned inside the outer pipe, the intermediary space between the inner and outer pipes being evacuated in order to isolate the hydrogen carried in the inner pipe from the air situated outside the outer pipe. In order to halt the flow of the hydrogen in the event of a leak and obtain a reliable pipeline, this pipeline comprises a valve to halt the flow of the hydrogen in the inner pipe as well as at least one pressure sensor configured to measure the pressure in the intermediary space. Thus, when the pressure sensor detects an increase in pressure in the intermediary zone, this corresponding to a probable high leak of hydrogen or of oxygen, the valve is switched over into the closed state.

Bearing in mind the distance between the tank and the turbine engines or the fuel cells, the pipelines each comprise a plurality of portions butted together.

Obtaining a pipeline that is reliable over its entire length, and, more particularly, in the regions where the portions are coupled to one another, proves to be problematical.

The present invention seeks to provide a solution to these problems.

SUMMARY OF THE INVENTION

To that end, the invention relates to a pipeline comprising at least first and second portions and at least one coupling system connecting the first and second portions, each of the first and second portions comprising an outer pipe, an inner pipe positioned inside the outer pipe, and an intermediary space situated between the outer and inner pipes and containing a first atmosphere, the pipeline comprising at least one leak detection system configured to determine a characteristic of the first atmosphere, the coupling system comprising at least a downstream flange ring connected to at least one of the outer and inner pipes of the first portion, at least an upstream flange ring connected to at least one of the outer and inner pipes of the second portion, and connecting elements connecting the upstream and downstream flange rings.

According to the invention, the coupling system comprises first and second annular seals interposed between the upstream and downstream flange rings and configured to delimit, with the upstream and downstream flange rings, a buffer space containing a second atmosphere, the pipeline comprising a leak detection system configured to determine at least one characteristic of the second atmosphere, the coupling system comprising at least one end stop to keep the first and second annular seals apart, the first annular seal having an inside diameter, the second annular seal being positioned inside the first annular seal and having an outside diameter. In addition to this, the end stop is a circular rib secured to a first flange ring of either the upstream or the downstream flange rings, the circular ring having an outside diameter substantially equal to the inside diameter of the first annular seal and an inside diameter substantially equal to the outside diameter of the second annular seal.

This solution makes it possible to detect a leak that might arise at the coupling system and make the pipeline more reliable.

According to another feature, the coupling system comprises at least one through-orifice passing through at least one of the upstream and downstream flange rings to cause the buffer space to communicate with one of the intermediary spaces of the first and second portions.

According to another feature, the coupling system comprises at least one spacer interposed between the upstream and downstream flange rings to keep them spaced apart.

According to another feature, each spacer is a tube configured to house one of the connecting elements.

According to another feature, the first and second annular seals are seals with a cross section in the shape of a sigma.

According to another feature, the coupling system comprises, for at least one of the first and second portions, a first flange ring connected to the outer pipe, a second flange ring connected to the inner pipe and a sealed connection connecting the first and second flange rings.

According to another feature, the sealed connection comprises at least one spacer interposed between the first and second flange rings in order to keep them spaced apart, connecting elements connecting the first and second flange rings and an annular seal interposed between the first and second flange rings.

According to another feature, at least one of the outer and inner pipes of at least one of the first and second portions comprises a system for compensating for expansion phenomena.

The invention also relates to an aircraft comprising at least one pipeline having one of the aforementioned features.

BRIEF DESCRIPTION OF THE DRAWINGS

Further features and advantages will become apparent from the following description of the invention, which description is given solely by way of example with reference to the attached drawings among which.

DETAILED DESCRIPTION OF THE PREFERRED EMBODIMENTS

Figure 1:
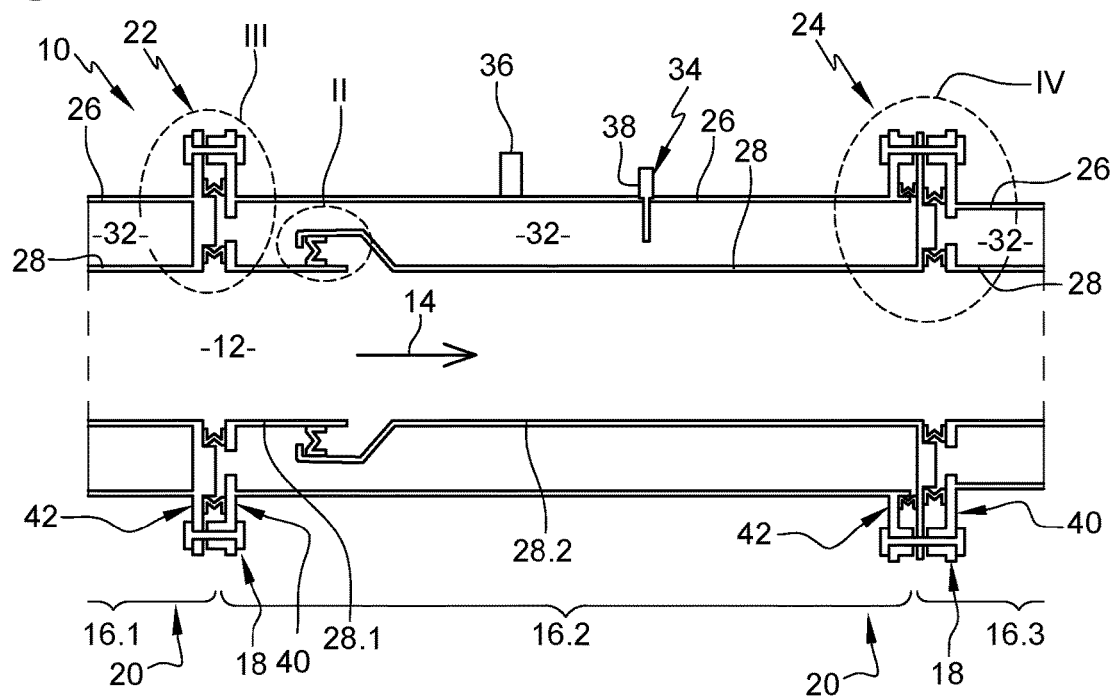
FIG. 1 is a longitudinal section through a pipeline illustrating a first embodiment of the invention.
Figure 2:
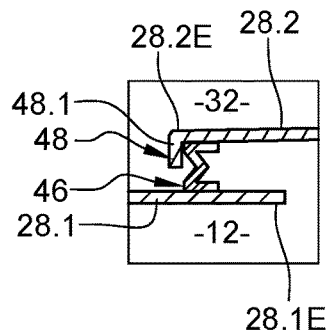
FIG. 2 is a section illustrating in detail a zone II of FIG. 1.

According to the first and second embodiments visible in FIGS. 1 to 7, a pipeline 10 is configured to carry a fluid 12 in a direction of flow 14.

According to one application, an aircraft comprises at least one such pipeline 10 to carry hydrogen in the liquid state or in the gaseous state.

For the remainder of the description, a longitudinal direction is a direction parallel to the direction of flow 14. The terms upstream and downstream refer to the direction of flow 14 of the fluid 12 in the pipeline 10, the fluid flowing from upstream to downstream.

The pipeline 10 comprises several portions, notably first, second and third portions 16.1, 16.2, 16.3 positioned end to end, the first portion 16.1 corresponding to an upstream portion positioned upstream of the second portion 16.2, the third portion 16.3 corresponding to a downstream portion positioned downstream of the second portion 16.2.

According to one configuration, the first, second and third portions 16.1, 16.2, 16.3 are identical.

Of course, the invention is not restricted to this number of portions. Whatever the embodiment, the pipeline 10 comprises at least two portions.

Each portion comprises an upstream end 18 and a downstream end 20. For each portion 16.1, 16.2, 16.3, the upstream end 18 is connected to the downstream end of the portion upstream by a first coupling system 22 and the downstream end 20 is connected to the upstream end of the portion downstream by a second coupling system 24. According to one configuration, the first and second coupling systems 22, 24 are identical.

Each portion 16.1, 16.2, 16.3 comprises an outer pipe 26, an inner pipe 28 configured to carry the fluid 12 and positioned inside the outer pipe 26.

According to one embodiment, the outer and inner pipes 26, 28 are cylindrical and have axes that are parallel to one another and to the longitudinal direction. In such an arrangement, the outer and inner pipes 26 are coaxial.

Figure 5:
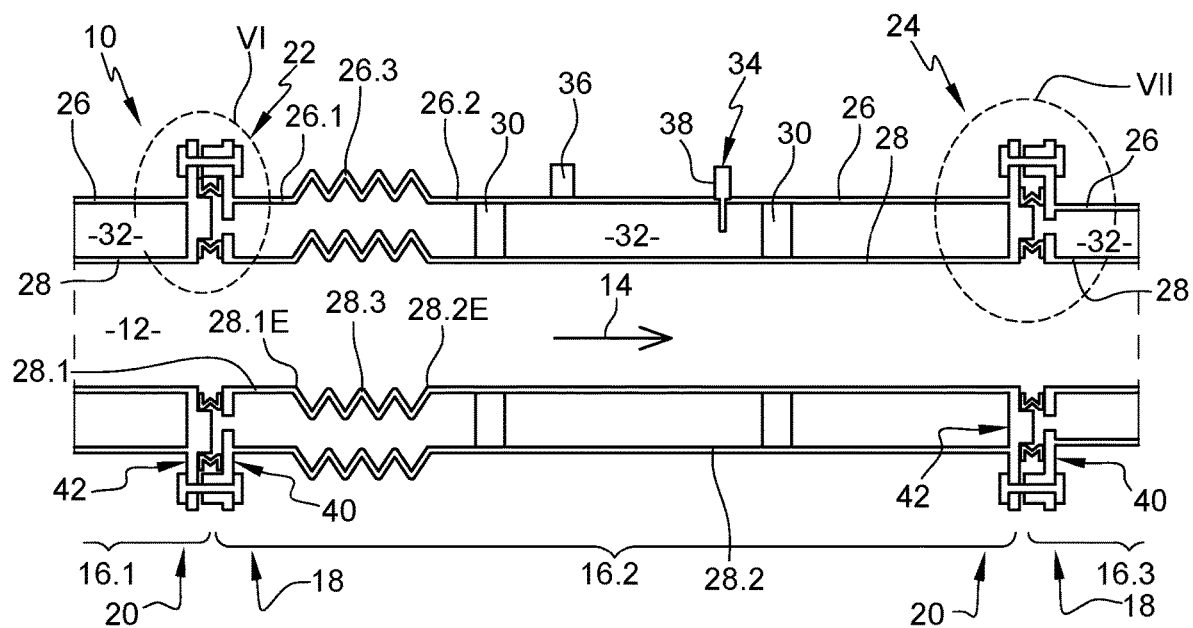
FIG. 5 is a longitudinal section through a pipeline illustrating a second embodiment.

In a configuration visible in FIG. 5, the portion 16.2 comprises at least one separator 30 keeping the outer and inner pipes 26, 28 spaced apart around their entire circumference. According to one arrangement, the portion 16.2 comprises two separators 30 spaced apart in the longitudinal direction. Each separator 30 comprises a flange ring which has an inside diameter substantially equal to the outside diameter of the inner pipe 28 and an outside diameter substantially equal to the inside diameter of the outer pipe 26. Of course, the invention is not restricted to this embodiment regarding the separator or separators 30.

Each portion 16.1, 16.2, 16.3 comprises an intermediary space 32 situated between the outer and inner pipes 26, 28 and containing an atmosphere.

The pipeline 10 comprises at least one leak detection system 34 configured to determine at least one characteristic of the atmosphere of the intermediary space 32. Each portion 16.1, 16.2, 16.3 comprises at least one leak detection system 34. In one application, this leak detection system 34 is used to operate a shutoff valve that cuts off the flow of fluid in the pipeline 10.

In a first configuration, the intermediary space 32 exhibits a given level of vacuum. With this first configuration, the portion 16.2 comprises a coupling 36 configured to couple evacuation equipment and for extracting the gas present in the intermediary space 32 so as to obtain the given level of vacuum. In addition to this, the leak detection system 34 comprises at least one pressure sensor 38 configured to measure a pressure in the intermediary space 32.

In a second configuration, the intermediary space 32 contains an inerting gas at a given pressure. With this second configuration, the portion 16.2 comprises a coupling 36 configured to couple evacuation equipment so as to extract the gas present in the intermediary space 32 and then supply an inerting gas to fill the intermediary space 32 with inerting gas at a given pressure. In addition to this, the leak detection system 34 comprises a sensor for measuring a concentration of oxygen or of hydrogen in the intermediary space 32.

Figure 3:
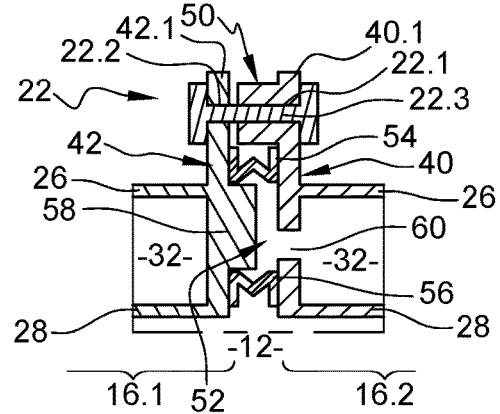
FIG. 3 is a section illustrating in detail a zone III of FIG. 1.
Figure 6:
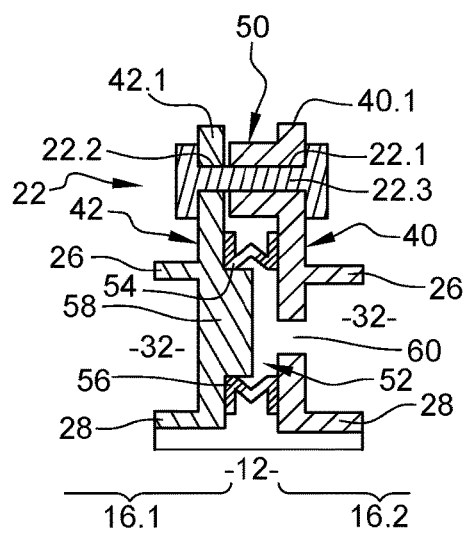
FIG. 6 is a section illustrating in detail a zone VI of FIG. 5.
Figure 7:
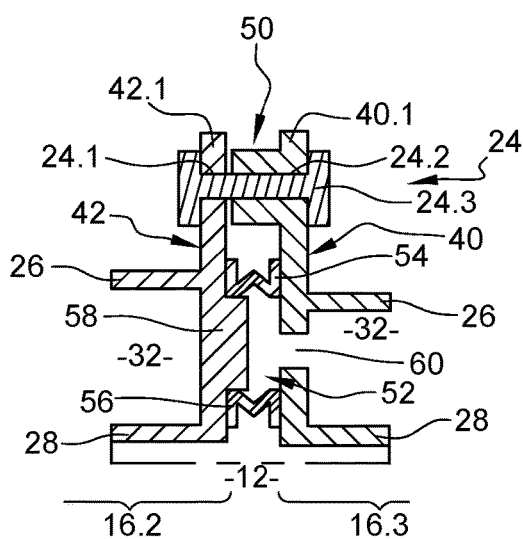
FIG. 7 is a section illustrating in detail a zone VII of FIG. 5.

In a first configuration visible notably in FIGS. 3, 6, 7, at least one portion 16.1, 16.2, 16.3 comprises an upstream flange ring 40 connecting the outer and inner pipes 26, 28 at the upstream end 18, and a downstream flange ring 42 connecting the outer and inner pipes 26, 28 at the downstream end 20. The upstream and downstream flange rings 40, 42 are identical and each take the form of a plate positioned in a plane approximately perpendicular to the longitudinal direction. Each upstream or downstream flange ring 40, 42 has an inside diameter substantially equal to the inside diameter of the inner pipe 28 and an outside diameter greater than the outside diameter of the outer pipe 26. The upstream and downstream flange rings 40, 42 are connected to the outer and inner pipes 26, 28 in a fluid tight manner.

Each of the upstream and downstream flange rings 40, 42 has a peripheral zone 40.1, 42.1 that extends beyond the outer pipe 26.

For a portion 16.2 being considered, the first coupling system 22 comprises first through-orifices 22.1 positioned in the peripheral zone 40.1 of the upstream flange ring 40 of the portion 16.2 concerned and second through-orifices 22.2 positioned in the peripheral zone 42.1 of the downstream flange ring 42 of the upstream portion 16.1, each of the first through-orifices 22.1 being positioned in line with a second through-orifice 22.2. In addition to this, the first coupling system 22 comprises first connecting elements 22.3 connecting the upstream and downstream flange rings 40, 42 and housed in the first and second through-orifices 22.1, 22.2. In parallel, the second coupling system 24 comprises first through-orifices 24.1 positioned in the peripheral zone 42.1 of the downstream flange ring 42 of the portion 16.2 concerned and second through-orifices 24.2 positioned in the peripheral zone 40.1 of the upstream flange ring 40 of the downstream portion 16.3, each of the first through-orifices 24.1 being positioned in line with a second through-orifice 24.2. In addition to this, the second coupling system 24 comprises second connecting elements 24.3 connecting the upstream and downstream flange rings 40, 42 and housed in the first and second through-orifices 24.1, 24.2.

Figure 4:
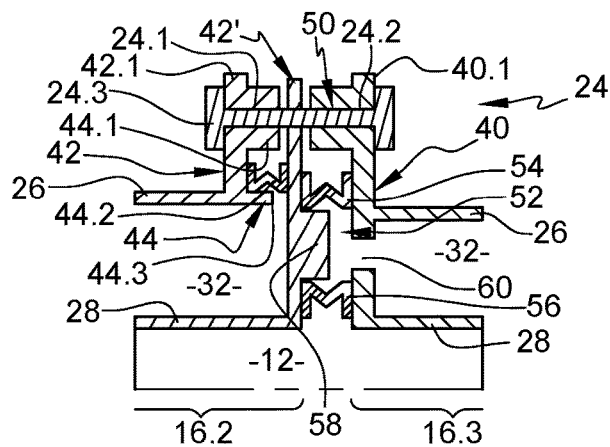
FIG. 4 is a section illustrating in detail a zone IV of FIG. 1.

In a second configuration visible notably in FIG. 4, for at least one portion 16.2, the coupling system 24 comprises a first downstream (or upstream) flange ring 42 connected to the outer pipe 26, a second downstream (or upstream) flange ring 42' connected to the inner pipe 28 and a fluid tight connection 44 connecting the first and second downstream (or upstream) flange rings 42, 42'. In a first arrangement, the first and second downstream (or upstream) flange rings 42, 42' are pressed firmly against one another over their entire circumference and kept pressed together by connecting elements. In a second arrangement, the fluid tight connection 44 comprises at least one spacer 44.1 interposed between the first and second downstream (or upstream) flange rings 42, 42' in order to keep them separated in the longitudinal direction over their entire circumference, connecting elements connecting the first and second downstream (or upstream) flange rings 42, 42', and an annular seal 44.2 interposed between the first and second downstream (or upstream) flange rings 42, 42'. In one configuration, the connecting elements of the fluid tight connection 44 are those of the coupling system 24. In addition to this, the fluid tight connection 44 comprises several spacers 44.1 distributed over the circumference of the first and second downstream (or upstream) flange rings 42, 42'. Each spacer 44.1 takes the form of a tube through which one of the connecting elements passes. The fluid tight connection 44 may comprise a spacer 44.1 for each connecting element.

In one arrangement, the annular seal 44.2 has an inside diameter substantially equal to the outside diameter of the outer pipe 26.

In order to hold the annular seal 44.2 in place, the sealed connection 44 comprises at least one end stop 44.3, secured to one of either the first or second downstream (or upstream) flange rings 42, 42', and configured according to the difference in pressure between the outside of the outer pipe 26 and the intermediary space 32. Because the pressure outside the outer pipe 26 is markedly higher than the pressure inside the intermediary space 32, the end stop 44.3 is tubular, connected to the first downstream flange ring 42, positioned in the continuation of the outer pipe 26 and inside the annular seal 44.2. By way of example, the annular seal 44.2 is a seal with a cross section in the shape of a sigma Σ, oriented in such a way that the pressure difference across the annular seal 44.2 enhances the sealing.

The invention is not restricted to these embodiments for the ends of the portions and the coupling systems 22, 24. Whatever the embodiment, a coupling system 22, 24 comprises at least a downstream flange ring 42 connected to at least one of the outer and inner pipes 26, 28 of a first portion, at least an upstream flange ring 40 connected to at least one of the outer and inner pipes 26, 28 of a second portion and connecting elements 22.3, 24.3 connecting the upstream and downstream flange rings 40, 42.

In order to take account of phenomena of expansion in the longitudinal direction, according to a first embodiment visible in FIG. 1, the inner pipe 28 comprises a first part 28.1 which extends from the upstream flange ring 40 as far as a first end 28.1E and a second part 28.2 which extends from the downstream flange ring 42 as far as a second end 28.2E, the first and second ends 28.1E, 28.2E being configured to slide one inside the other. According to one arrangement, the first end 28.1E slides inside the second end 28.2E which has an enlarged cross section. In this first embodiment, as illustrated in detail in FIG. 2, the inner pipe 28 has at least one annular seal 46 interposed between the first and second ends 28.1E, 28.2E, positioned in the zone of overlap of the first and second ends 28.1E, 28.2E. In addition to this, the inner pipe 28 comprises at least one end stop 48 to hold the annular seal 46 in place between the first and second ends 28.1E, 28.2E and configured according to the pressure difference between the inside of the inner pipe 28 and the intermediary space 32. Because the pressure inside the inner pipe 28 is markedly higher than that inside the intermediary space 32, the end stop 48 comprises a rim 48.1 connected to the second part 28.2 of the inner pipe 28 and positioned level with the second end 28.2E. By way of example, the annular seal 46 is a seal with a cross section in the shape of a sigma Σ, oriented in such a way that the pressure difference across the annular seal 46 improves the sealing.

According to a second embodiment visible in FIG. 5, the inner pipe 28 comprises a part 28.1 which extends from the upstream flange ring 40 as far as a first end 28.1E, a second part 28.2 which extends from the downstream flange ring 42 as far as a second end 28.2E and a bellows 28.3 connecting the first and second parts 28.1, 28.2 and more particularly the first and second ends 28.1E, 28.2E thereof.

According to this second embodiment, the outer pipe 26 may comprise first and second parts 26.1, 26.2 as well as a bellows 26.3 connecting the first and second parts 26.1, 26.2.

Of course, the invention is not restricted to these embodiments, at least one of the outer and inner pipes of at least one portion comprising a system for compensating phenomena of expansion in the longitudinal direction.

According to one feature of the invention, at least one coupling system 22, 24 comprises at least one spacer 50 interposed between the upstream and downstream flange rings 40, 42 in order to keep them spaced apart and create a buffer space 52 between the upstream and downstream flange rings 40, 42.

According to one configuration, the coupling system 22, 24 comprises several spacers 50 distributed over the entire circumference of the upstream and downstream flange rings 40, 42. Each spacer 50 is a tube configured to house one of the connecting elements 22.3, 24.3. The coupling system 22, 24 comprises as many spacers 50 as there are connecting elements 22.3, 24.3. The spacers 50 all have the same length (dimension measured in the longitudinal direction).

The coupling system 22, 24 comprises first and second annular seals 54, 56 interposed between the upstream and downstream flange rings 40, 42 and positioned in such a way as to isolate the buffer space 52 from the inside of the inner pipe 28 and from the outside of the outer pipe 26. In one arrangement, the first annular seal 54 is positioned in the continuation of the outer pipes 26 and the second annular seal 56 is positioned inside the first annular seal 54 in the continuation of the inner pipes 28. By way of example, the first and second annular seals 54, 56 are seals with a cross section in the shape of a sigma Σ, which are oriented in such a way that the pressure difference across the annular seals 54, 56 improves the sealing.

Whatever the embodiment, the first and second annular seals 54, 56 delimit, with the upstream and downstream flange rings 40, 42, a buffer space 52 which allows detection of any leakage that might arise at the coupling system 22, 24. Thus, it is possible for the coupling system 22, 24 not to comprise a spacer 50 if the first and second annular seals are configured to perform the function of a spacer 50.

In one configuration, each coupling system 22, 24 comprises at least one spacer 50 to maintain the spacing of the upstream and downstream flange rings 40, 42 and the first and second annular seals 54, 56 which with the upstream and downstream flange rings 40, 42 delimit a buffer space 52 containing an atmosphere.

The coupling system 22, 24 comprises at least one end stop 58 to keep the first and second annular seals 54, 56 apart. This or these end stop(s) 58 is (are) configured according to the difference in pressure between, on the one hand, the buffer space 52 and, on the other hand, the inside of the inner pipe 28 and the outside of the outer pipe 26.

Because the pressure in the buffer space 52 is markedly lower than that inside the inner pipe 28 and that outside the outer pipe 26, the coupling system 22, 24 comprises an end stop 58 interposed between the first and second annular seals 54, 56 to prevent these seals from moving closer together. In one configuration, the end stop 58 is a circular rib secured to the upstream flange ring 40 which has an outside diameter substantially equal to the inside diameter of the first annular seal 54 and an inside diameter substantially equal to the outside diameter of the second annular seal 56. Of course, the invention is not restricted to this embodiment for the end stop or stops 58. Such stop or stops could be secured to the downstream flange ring 42.

At least one of the end stops 58 has a dimension, in a longitudinal direction, that is less than the length of the spacers 50.

The pipeline 10 comprises at least one leak detection system configured to determine at least one characteristic of the atmosphere in the buffer space 52.

In a first configuration, the buffer space 52 exhibits a given level of vacuum. In addition to this, the leak detection system comprises at least one pressure sensor for measuring the pressure in the buffer space 52 in order to detect a leak.

In another configuration, the buffer space 52 contains an inerting gas at a given pressure. In addition to this, the leak detection system that detects leaks with the coupling systems 22, 24 comprises at least one sensor configured to detect a concentration of hydrogen or of oxygen in the buffer space 52 in order to detect a leak.

According to another embodiment, the coupling system 22, 24 comprises at least one through-orifice 60 passing through the upstream or downstream flange ring 40, 42 to cause the buffer space 52 to communicate with one of the intermediary spaces 32 of the upstream and downstream portions. Thus, the buffer space 52 and the intermediary space 32 have the same atmosphere, the same pressure and a single leak detection system 34, such as a pressure sensor 38, able to detect a leak into the intermediary and buffer spaces 32, 52.

In one arrangement, the coupling system 22, 24 comprises several orifices 60 distributed over the circumference of the upstream or downstream flange ring 40, 42. Providing a plurality of orifices improves the detection of a leak in the buffer space 52 by a leak detection system positioned at the intermediary space 32. These orifices 60 are evenly distributed over the entire circumference of the upstream or downstream flange ring 40, 42. The orifices 60 are provided on the upstream flange ring 40 of the downstream portion. However, they could be positioned on the downstream flange ring 42 of the upstream portion. In one configuration, the end stop 58 is secured to a first flange ring of either the upstream or the downstream flange rings 40, 42 and the orifice (or orifices) is (or are) positioned on a second flange ring out of the upstream and downstream flange rings 40, 42, which is different than the first flange ring.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pipeline comprising:
    at least first and second portions,
    at least one coupling system connecting the first and second portions,
        each of the first and second portions comprising:
            an outer pipe,
            an inner pipe positioned inside the outer pipe,
            an intermediary space situated between the outer and inner pipes and containing a first atmosphere,
        at least one leak detection system configured to determine a characteristic of the first atmosphere,
        the coupling system comprising:
            at least a downstream flange ring connected to at least one of the outer and inner pipes of the first portion,
            at least an upstream flange ring connected to at least one of the outer and inner pipes of the second portion, and
            connecting elements connecting the upstream and downstream flange rings,
        wherein the coupling system comprises first and second annular seals interposed between the upstream and downstream flange rings and configured to delimit, with the upstream and downstream flange rings, a buffer space containing a second atmosphere,
        wherein the pipeline comprises at least one leak detection system configured to determine at least one characteristic of the second atmosphere,
        wherein the coupling system comprises at least one end stop to keep the first and second annular seals apart,
        wherein the first annular seal has an inside diameter,
        wherein the second annular seal is positioned inside the first annular seal and has an outside diameter,
        wherein the end stop is a circular rib secured to a first flange ring of the downstream flange ring, the circular rib having an outside diameter substantially equal to the inside diameter of the first annular seal and an inside diameter substantially equal to the outside diameter of the second annular seal, so as to provide a sealed connection between the first annular seal and the second annular seal,
        wherein the coupling system comprises at least one through-orifice passing through the upstream flange ring to cause the buffer space to communicate with one of the intermediary spaces of the first and second portions, and
        wherein the through-orifice is positioned on a second flange ring of the upstream flange ring, which is different than the first flange ring,
        wherein the coupling system comprises at least one spacer interposed between the upstream and downstream flange rings to keep the upstream and downstream flange rings spaced apart,
        wherein each spacer is a tube configured to house one of the connecting elements.

2. The pipeline as claimed in claim 1, wherein the first and second annular seals are seals with a cross section that is sigma shaped.

3. The pipeline as claimed in claim 1, wherein the coupling system comprises, for at least one of the first and second portions, the first flange ring connected to the outer pipe, the second flange ring connected to the inner pipe and a sealed connection connecting the first and second flange rings.

4. The pipeline as claimed in claim 1, wherein the sealed connection connecting the first and second flange rings comprises at least one spacer interposed between the first and second flange rings configured to keep them spaced apart, the connecting elements connecting the first and second flange rings and an annular seal interposed between the first and second flange rings.

5. The pipeline as claimed in claim 1, wherein at least one of the outer and inner pipes of at least one of the first and second portions comprises a system for compensating for expansion phenomena.

6. An aircraft comprising at least one pipeline as claimed in claim 1.

* * * * *